United States Patent
Jeon

(10) Patent No.: US 10,255,673 B2
(45) Date of Patent: Apr. 9, 2019

(54) APPARATUS AND METHOD FOR DETECTING OBJECT IN IMAGE, AND APPARATUS AND METHOD FOR COMPUTER-AIDED DIAGNOSIS

(71) Applicant: SAMSUNG ELECTRONICS CO., LTD., Suwon-si (KR)

(72) Inventor: Joo Hyuk Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 14/969,108

(22) Filed: Dec. 15, 2015

(65) Prior Publication Data

US 2016/0171341 A1    Jun. 16, 2016

(30) Foreign Application Priority Data

Dec. 15, 2014    (KR) .................. 10-2014-0180641

(51) Int. Cl.
*G06K 9/68* (2006.01)
*G06T 7/00* (2017.01)
(Continued)

(52) U.S. Cl.
CPC .......... *G06T 7/0012* (2013.01); *G06K 9/4609* (2013.01); *G06K 9/6857* (2013.01); *G06T 7/75* (2017.01); *G06T 2207/20016* (2013.01); *G06T 2207/20076* (2013.01); *G06T 2207/30096* (2013.01)

(58) Field of Classification Search
CPC ..................... G06T 7/0012; G06T 7/75; G06T 2207/20076; G06T 2207/20016; G06T 2207/30096; G06K 9/4609; G06K 9/6267; G06K 9/4671; G06K 9/6202; G06K 9/6282; G06K 9/46; G06K 9/6218; G06K 9/6857; G06K 9/628
See application file for complete search history.

(56) References Cited

U.S. PATENT DOCUMENTS 6,324,532 B1 *   11/2001   Spence ................ G06K 9/3241
                                                          706/19
7,466,841 B2    12/2008   Bahlmann et al.
(Continued)

FOREIGN PATENT DOCUMENTS

KR    10-2005-0097314 A    10/2005
KR    10-1364046 B1    2/2014

OTHER PUBLICATIONS

R. Benenson et al; "Pedestrian detection at 100 frames per second"; Proc. of CVPR; 2012; 8 pgs. total.
(Continued)

*Primary Examiner* — Carol Wang
(74) *Attorney, Agent, or Firm* — Sughrue Mion, PLLC

(57) ABSTRACT

An apparatus for detecting an object in an image, including a detection group determiner configured to classify a plurality of feature levels into one or more detection groups, wherein the plurality of feature levels includes multiple scales and are arranged as a feature pyramid; and a detection group processor configured to create one or more feature maps corresponding to the one or more detection groups, and to detect an object by applying one or more models to the one or more feature maps.

20 Claims, 14 Drawing Sheets

(51) Int. Cl.
*G06K 9/46* (2006.01)
*G06T 7/73* (2017.01)

(56) References Cited

U.S. PATENT DOCUMENTS

| | | | | |
|---|---|---|---|---|
| 7,818,797 | B1* | 10/2010 | Fan | H04L 63/1425 |
| | | | | 726/22 |
| 7,868,772 | B2 | 1/2011 | Chao et al. | |
| 8,995,772 | B2* | 3/2015 | Kienzle | G06K 9/4614 |
| | | | | 382/118 |
| 2005/0047647 | A1* | 3/2005 | Rutishauser | G06K 9/3233 |
| | | | | 382/159 |
| 2007/0217676 | A1* | 9/2007 | Grauman | G06K 9/4671 |
| | | | | 382/170 |
| 2014/0023232 | A1* | 1/2014 | Kim | G06K 9/00624 |
| | | | | 382/103 |
| 2015/0148677 | A1* | 5/2015 | Mullick | A61B 8/5223 |
| | | | | 600/443 |

OTHER PUBLICATIONS

J. Yan et al; "Robust Multi-Resolution Pedestrian Detection in Traffic Scenes"; In Proc. of CVPR; 2013; 8 pgs. total.
D. Park et al; "Multiresolution models for object detection"; In Proc. of ECCV; 2010; 14 pgs. total.
P. Dollar et al; "The Fastest Pedestrian Detector in the West"; in Proc. of BMVC; 2010; 11 pgs. total.
P. Felzenswalb; et al; "Object Detection with Discriminatively Trained Part Based Models"; TPAMI; 2010; 20 pgs. total.

* cited by examiner

FIG.5A

| LEVEL | SCALE | FEATURE MAP SIZE |
|---|---|---|
| p | $s^p$ | $W \times H \times d \times s^{2 \times p}$ |
| p-1 | $s^{p-1}$ | $W \times H \times d \times s^{2 \times (p-1)}$ |
| ... | ... | ... |
| 2 | $s^2$ | $W \times H \times d \times s^{2 \times 2}$ |
| 1 | $s^1$ | $W \times H \times d \times s^{2 \times 1}$ |
| 0 | $s^0$ | $W \times H \times d \times s^{2 \times 0}$ |

$w \times h \times d$ FILTER

FEATURE PYRAMID

APPARATUS AND METHOD FOR DETECTING OBJECT IN IMAGE, AND APPARATUS AND METHOD FOR COMPUTER-AIDED DIAGNOSIS

CROSS-REFERENCE TO RELATED APPLICATION(S)

This application claims priority from Korean Patent Application No. 10-2014-0180641, filed on Dec. 15, 2014, in the Korean Intellectual Property Office, the disclosure of which is incorporated herein by reference in its entirety.

BACKGROUND

1. Field

The following description relates to an apparatus and method for detecting an object in an image, and a computer-aided diagnosis (CAD) apparatus and method for diagnosing a medical image using the object detection apparatus and method.

2. Description of the Related Art

Research on various technologies involving detection of an object in an image has been actively conducted in the image processing industry. Generally, the algorithms used to detect an object in an image are a scale-invariant model or a multi-scale model. Both models work to calculate scores for each location in an image, but the scale-invariant model applies a single model to multi-scale feature maps of an image, while the multi-scale model applies filters of multiple scales to a feature map at a single scale location.

The advantage of using the scale-invariant model to calculate scores of each location by applying a single model, i.e., a filter of a single scale to each location in feature maps at multiple scales, is that it reduces score computation costs; however, it still incurs large costs when generating feature maps at multiple scales. On the other hand, the multi-scale model uses only one feature map, and hence incurs a relatively small cost when generating a feature map, but still incurs a relatively large score computation cost because it calculates the scores by applying filters of multiple scales to each location in the feature map.

SUMMARY

According to an aspect of an exemplary embodiment, an apparatus for detecting an object in an image includes a detection group determiner configured to classify a plurality of feature levels into one or more detection groups, wherein the plurality of feature levels includes multiple scales and are arranged as a feature pyramid; and a detection group processor configured to create one or more feature maps corresponding to the one or more detection groups, and to detect an object by applying one or more models to the one or more feature maps.

The detection group determiner may further include a computational cost estimator configured to generate a plurality of computational cost estimates corresponding to the plurality of feature levels, and a detection group classifier configured to classify the plurality of feature levels into the one or more detection groups using the plurality of computational cost estimates.

The plurality of computational cost estimates may include a first plurality of feature generation computation costs associated with feature generation during application of a scale-invariant model, a first plurality of score computation costs associated with score calculation during application of a scale-invariant model, and a second plurality of score computation costs associated with score calculation during application of a multi-scale model.

The detection group classifier may be further configured to compare the first plurality of feature generation costs and the first plurality of computational costs, to the second plurality of score computation costs, and classifies the plurality of feature levels into the one or more detection groups based on the comparison.

The detection group processor may further include a feature map creator configured to create one or more feature maps associated with the one or more detection groups, wherein each one of the one or more feature maps is created at a scale corresponding to a lowest feature level in each one of the one or more detection groups.

The detection group processor may be further configure to determine a number of models to be applied the one or more detection group based on one or more sizes associated with the one or more detection groups.

The model applier may be further configured to calculate one or more scores corresponding to the one or more detection groups by applying the a plurality of scaled filters to the one or more feature maps, wherein a number of the plurality of scaled filters corresponds to the number of models, and detects an object using the one or more scores.

The model applier may be further configured to adjust a frequency of detection based on a size of the object to be detected and calculates the one or more scores based on the adjusted frequency of detection.

According to another aspect of an exemplary embodiment, a method for detecting an object in an image includes classifying a plurality of feature levels into one or more detection groups, wherein the plurality of feature levels includes multiple scales and is arranged as a feature pyramid; creating one or more feature maps associated with the one or more detection groups; and detecting an object by applying one or more models to the one or more feature maps.

The classifying the plurality of feature levels into the one or more detection groups may further include generating a plurality of computational cost estimates associated with the plurality of feature levels and classifying the plurality of feature levels into the one or more detection groups using the plurality of computational cost estimates.

The plurality of computational cost estimates may include a first plurality of feature generation computation costs associated with feature generation during application of a scale-invariant model, a first plurality of score computation costs associated with score calculation during application of a scale-invariant model, and a second plurality of score computation costs associated with score calculation during application of a multi-scale model.

The classifying the plurality of feature levels into the one or more detection groups may further include comparing the first plurality of feature generation computation costs and the first plurality of score computation costs, with the second plurality of score computation costs, and the plurality of feature levels is classified into the one or more detection groups based on the comparison.

The classifying the plurality of feature levels into the one or more detection group may further include: creating a first detection group that includes a lowest feature level of the feature pyramid; calculating a first computation cost by combining a first feature generation computation cost of the first plurality of feature generation computation costs with a first score computation costs of the first plurality of score computation costs; comparing the first computation cost with a second score computation cost of the second plurality of computational costs associated with a first feature level that is higher than a highest feature level of the first detection group; in response to the first computation cost being greater than the second score computation cost, adding the first feature level to the first detection group, and in response to the first computation cost being less than or equal to than the second score computation cost, creating a second detection group to include the first feature level.

The creating of the one or more feature maps may further include creating a feature map at a level that corresponds to a lowest feature level in each one of the one or more detection groups.

The detection of the object may further include determining a number of models to be applied to the one or more detection groups based on one or more sizes associated with the one or more detection group.

The detecting the object may further include calculating one or more scores corresponding to the one or more detection groups by applying a plurality of scaled filters to the one or more feature maps, wherein a number of the plurality of scaled filters corresponds to the number of models, and detecting an object using the one or more scores.

The detecting the object may further include adjusting a frequency of detection based on a size of the object to be detected, and wherein the calculating the one or more scores may further include calculating the one or more scores based on the adjusted frequency of detection.

According to a further aspect of an exemplary embodiment, a computer-aided diagnosis (CAD) apparatus includes an image inputter configured to receive an input medical image; a lesion detector configured to classify a scale-space into one or more detection groups, create one or more feature maps associated with the one or more detection groups, and detect a lesion by applying one or more models to the one or more feature map; and a lesion determiner configured to determine whether the detected lesion is benign or malignant.

The lesion detector may be further configured to estimate a first plurality of feature generation computation costs and a first plurality of score computation costs associated with applying a scale-invariant model, and to estimate a second plurality of score computation costs by associated with applying a multi-scale model, and to classify the plurality of scales into the one or more detection groups by taking into consideration the first plurality of feature generation computation costs, the first plurality of score computation costs, and the second plurality of score computation costs.

The lesion detector may be further configured to determine a number of the one or more models based on one or more sizes associated with the one or more detection groups, calculate a plurality of scores associated with a plurality of locations by applying one or more filters of different scales, wherein a number of the one or more filters is equal to the number of the one or more models, and detect that a location of the plurality of location whose score estimate is greater than a designated threshold is the lesion.

Other features and aspects will be apparent from the following detailed description, the drawings, and the claims.

BRIEF DESCRIPTION OF THE DRAWINGS

FIGS. 5A to 5D are diagrams for explaining classification of detection groups and an application of a model, according to exemplary embodiments.

Figure 1:
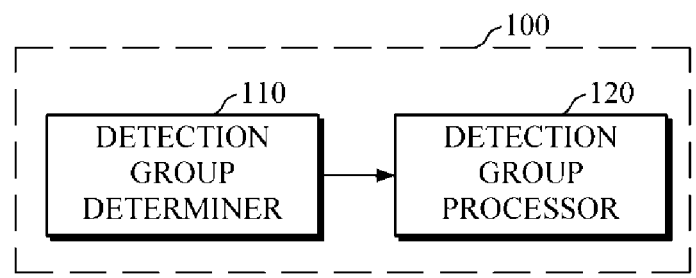
FIG. 1 is a block diagram illustrating an apparatus for detecting an object according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
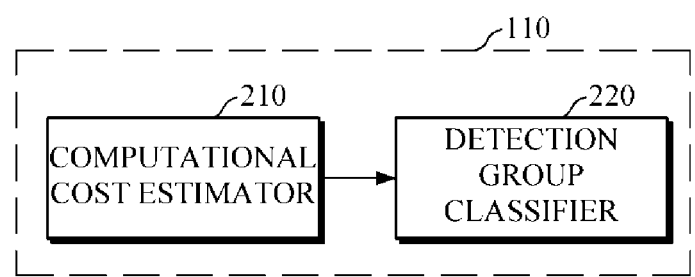
FIG. 2 is a block diagram illustrating in detail a detection group determiner of the apparatus of FIG. 1, according to an exemplary embodiment.
Figure 3:
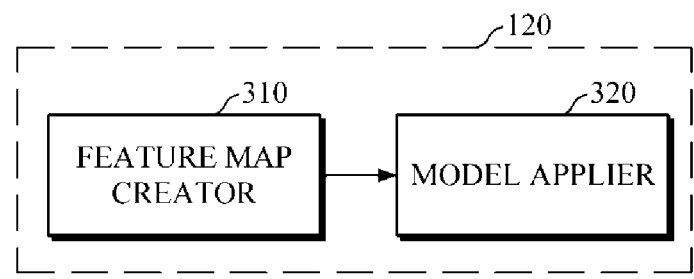
FIG. 3 is a block diagram illustrating in detail a detection group processor of the apparatus of FIG. 1, according to an exemplary embodiment.

FIG. 1 is a block diagram illustrating an example of an apparatus for detecting an object according to an exemplary embodiment. FIG. 2 is a block diagram illustrating in detail an example of a detection group determiner of the apparatus of FIG. 1 according to an exemplary embodiment. FIG. 3 is a block diagram illustrating in detail an example of a detection group processor of the apparatus of FIG. 1 according to an exemplary embodiment.

Referring to FIG. 1, the apparatus 100 for detecting an object includes a detection group determiner 110 and a detection group processor 120.

The detection group determiner 110 classifies the entire scale-space for features into one or more detection groups in order to detect an object in image data. For example, the entire scale-space for the features may be a feature pyramid consisting of a plurality of feature levels of different scales.

Referring to FIG. 2, the detection group determiner 110 may include a computational cost estimator 210 and a detection group classifier 220.

The computational cost estimator 210 may collect various working states, computing performance, etc., of the object detection apparatus 100, and estimate computational cost according to each primary operation that is required for object detection by analyzing the collected information. At this time, the computational cost according to primary operation may be estimated for each feature level of the feature pyramid.

The detection group classifier 220 may use the computational cost according to each primary operation to classify the entire scale-space into one or more detection groups. For example, the detection group classifier 220 may generate one detection group that includes the lowest feature level of what is deemed a pyramid of features; thereafter, the detection group classifier 220 may proceed to a higher feature levels and generate a new detection group for each level using computational cost estimates thereof in order to classify the feature levels into one or more detection groups.

An exemplary embodiment of the detection group determiner 110 will be described in detail below with reference to FIGS. 5A to 5C.

Referring back to FIG. 1, the detection group processor 120 detects an object by applying one or more models to each classified detection group.

More specifically, referring to FIG. 3, the detection group processor 120 may include a feature map creator 310 and a model applier 320.

The feature map creator 310 may create a feature map for each of the classified detection groups. At this time, the feature map creator 310 may create a feature map at a scale that corresponds to the lowest feature level in each detection group.

The model applier 320 may apply a model to the feature map created for each detection group, and detect an object using the result of application. The number of feature maps to be applied to each detection group may depend on the size of each detection group. Here, the size of each detection group may indicate the number of feature levels included in the detection group. For example, if a given detection group includes four feature levels, the model applier 320 may designate a model that consists of four filters of different scales to be applied to the detection group.

The model applier 320 may apply, to the feature map, filters of different scales designated for a specific detection group and calculate a score for each location, the score indicating a probability of an object being present at the location. Also, if the calculated score is greater than a designated threshold, the model applier 320 may allow the object to be returned to said location, or it may allow the object to be returned to a certain location based on the order of calculated scores (high to low), each to which locations have been assigned.

For example, the model applier 320 may calculate a score of each location, using the sliding window-based detection technique. Generally, the sliding window-based detection technique, after a detector or a model which consists of filters of a given size is learned, then a score of each location may be calculated by moving a specific filter to each location in an image.

In addition, the model applier 320 may adjust the frequency of detection based on the size of an object of interest or the scale of the determined filter, and calculate the score of each location based on the adjusted frequency of detection. For example, when attempting to detect an object that is of 3 cm in size, if the detection is performed covering a distance at intervals of 3 cm across a feature map, then it would be possible for such an object to be detected and for ensuing calculations to be performed.

Figure 4A:
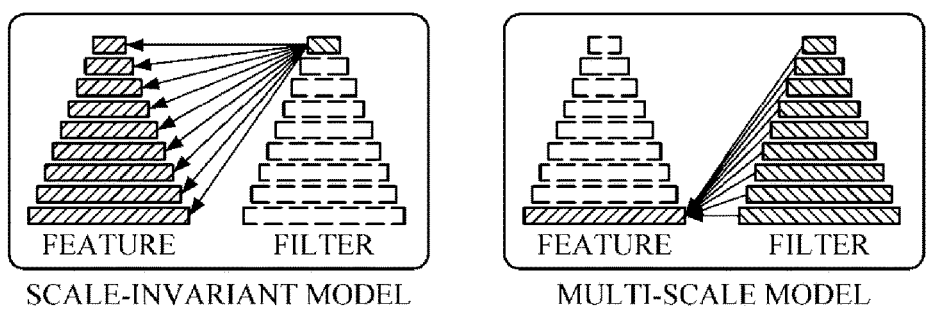
FIGS. 4A and 4B are diagrams for describing an object detection model that incorporates a scale-invariant model and a multi-scale model, according to exemplary embodiments.
Figure 4B:
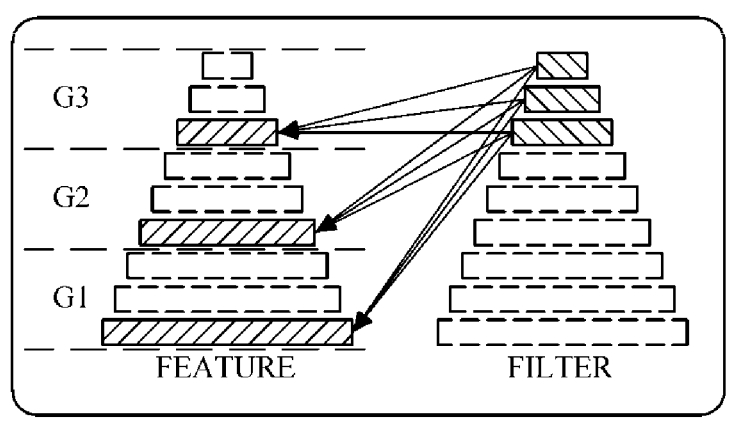

FIGS. 4A and 4B are diagrams for explaining an example of a concept of an object detection model that incorporates a scale-invariant model and a multi-scale model.

FIG. 4A shows conceptual diagrams of an example of a scale-invariant model and a multi-scale model, which are general object detection models which may be used to detect an object in an image. As shown in FIG. 4A, the scale-invariant model is a scheme in which one filter is applied to a feature pyramid consisting of feature maps of multiple scales in order to calculate scores for each location in each feature map. On the other hand, the multi-scale model is a scheme in which filters of multiple different scales are applied to one feature map so as to calculate the scores for each location.

Generally, because the scale-invariant model uses feature maps of multiple scales, the cost for extracting a feature map at each scale from the image (i.e., a computational cost for feature generation, which will be hereinafter referred to as "feature generation computation cost") may be relatively greater than that of the multi-scale model. On the other hand, because only one filter is used to calculate the scores, the score computation cost may be relatively lower than that of the multi-scale model. By contrast, the multi-scale model uses only a single feature map, and thus its feature generation computation cost may be relatively lower than that of the scale-invariant model, whereas its score computation cost may be relatively large due to the use of multiple filters.

As such, the computational cost incurred when the scale-invariant model is applied is different from that which is incurred when the multi-scale model is applied. FIG. 4B presents an example of an object detection model that incorporates the scale-invariant model and the multi-scale model in an effort to reduce the overall computational cost incurred.

A combined object model shown in FIG. 4B may be applicable to the object detection apparatus 100 as illustrated in FIGS. 1 to 3. Referring to FIG. 4B, the combined object model uses only some but not all feature maps used in the scale-invariant model as discussed above. Also, unlike the multi-scale model that applies all filters at different scales to each feature map as discussed above, the combined object model uses only some filters, thereby reducing the number of feature maps and filters needed to compute scores.

For example, as shown in FIG. 4B, the detection group determiner 110 may classify each feature level of the feature pyramid into three detection groups G1, G2, and G3. At this time, for each feature level of the feature pyramid, the detection group determiner 110 may estimate a computational cost incurred by applying the scale-invariant model and a computation cost incurred by applying the multi-scale model. Then, the detection group estimator 110 may classify the feature levels into corresponding detection groups by comparing the computational cost estimates.

At this time, the detection group processor 120 may generate only one feature map for each detection group G1, G2, and G3. As described in FIG. 4B, the feature map for each detection group G1, G2, and G3 may correspond to the lowest level in each detection group. As the size of each detection group is 3, the detection group processor 120 may apply three filters to each feature map to compute scores.

In the exemplary embodiment, it is described that the combined object model incorporates a scale-invariant model and a multi-scale model, but aspects of the present disclosure are not limited thereto, such that an approximate feature-based model, which uses a plurality of feature maps, and an approximate model-based model, which applies a plurality of filters, may be combined with each other.

FIGS. 5A to 5D are diagrams for explaining classification of detection groups and an application of a model, according to an exemplary embodiment.

An exemplary embodiment in which the object detection apparatus 100 detects an object, employing the combined object detection model as shown in FIG. 4B will be described in detail with reference to FIGS. 1, and 5A to 5D.

With regards to a feature pyramid to which a scale-invariant model is to be applied, FIG. 5A shows examples of a scale of each of the feature levels 0, 1, 2, . . . , p-1, and p along with the corresponding size of each feature map. In FIG. 5A, s is a value that is smaller than 1, indicating a scale reduction rate of each feature map. Also, p denotes the number of feature levels, indicating the height of the feature pyramid.

Figure 5B:
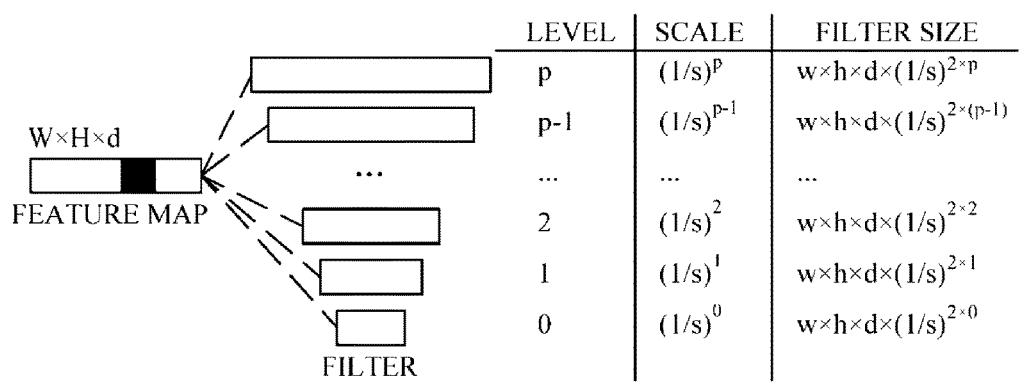

FIG. 5B shows examples of the number of filters for a multi-scale model and the scale and size of each filter. Like in FIG. 5A, s is a value that is smaller than 1, indicating a scale reduction rate of each feature map. Also, p denotes the number of filters.

When a scale-invariant model is applied to feature maps of levels 0, 1, 2, . . . , p-1, and p using a filter of level 0, the detection group determiner 110 may calculate a computational cost (CF_S, CS_S) using Equation 1 below. At this time, the computational cost may include a first feature generation computation cost (CF_S[l]) for creating a feature map for each level l and a first score computation cost (CS_S[l]) for calculating a score by applying a filter to a feature map of each level l. In Equation 1, A and B are each an arbitrary constant, which may be set to an appropriate value through a pre-processing phase. In addition, W, H, and D denote, respectively, the width, height, and dimension of a feature level 0, which serves as a reference. w, h, and d denote, respectively, the width, height, and dimension of filter level 0, which serves as a reference.

$$CF\_S[l] = A \times W \times H \times d \times s^{2l}$$

$$CS\_S[l] = B \times W \times H \times d \times s^{2l} \times w \times h \times d \quad (1)$$

In addition, as shown in FIG. 5B, when a multi-scale model is applied to a feature map, for example, a feature map at a level of 0, using a number of filters of different sizes such as 0, 1, 2, . . . , p-1, and p, the detection group determiner 110 may calculate a computational cost (CF_M, CS_M) using Equation 2 below. The computational cost may include a second feature generation computation cost (CF_M[l]) for creating a feature map and a second score computation cost (CS_M[l]) for calculation a score. In Equation 2, k denotes a starting level, i.e., the lowest level, of the detection group that includes the current filter level l.

$$CF\_M[l] = 0$$

$$CS\_M[l] = B \times W \times H \times d \times s^{2k} \times w \times h \times d \times (1/s)^{2(l-k)} \quad (2)$$

Figure 5C:
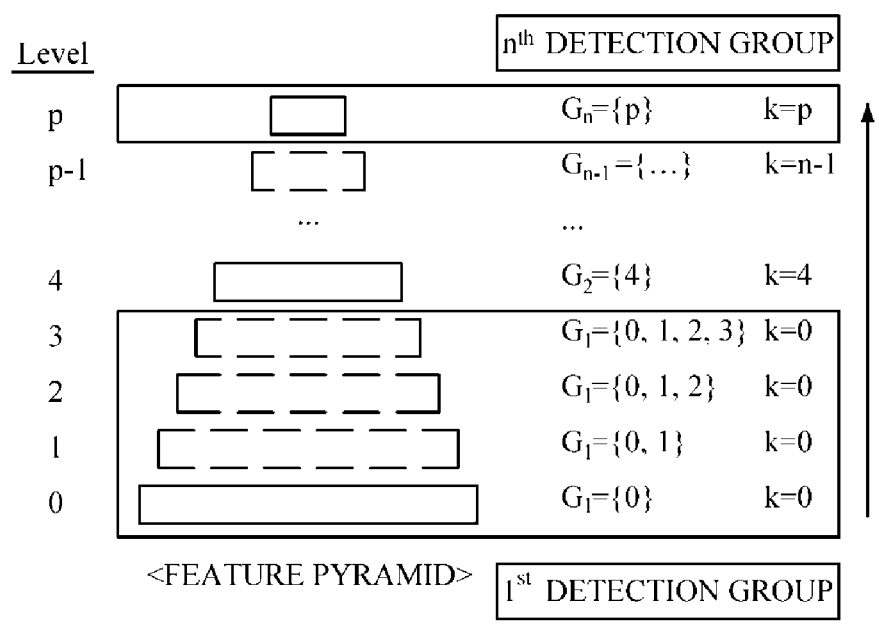

FIG. 5C is a diagram for explaining an example of a process in which the detection group determiner 110 classifies levels of a feature pyramid into one or more detection groups, using an computational cost estimate for each level, in order to generate a combined object model.

Referring to FIG. 5C, the detection group determiner 110 generates one detection group that includes level 0 of the feature pyramid. Then, with respect to the remaining levels, starting from level 1, the detection group determiner 110 estimates both a computational cost incurred by applying the scale-invariant model and a computational cost incurred by applying the multi-scale model, then compares in turn the computational cost estimates for each level, and then determines whether to add the current level 1 into a previously generated detection group, or to generate a new detection group that includes the current level 1.

For example, the detection group determiner 110 generates a detection group $G_1$ that includes level 0, and sets k to 0 to indicate that the starting level of the detection group $G_1$ is 0. Then, by using Equation 1 and Equation 2, the detection group determiner 110 calculates a first feature generation computation cost (CF_S[1]), a first score computation cost (CS_S[1]), a second feature generation computation cost (CF_M[1]), and a second score computation cost (CS_M[1]) with respect to level 1. Thereafter, the detection group determiner 110 compares the first computational cost (CF_S[1]+CS_S[1]), which is the sum of the first feature generation computation cost (CF_S[1]) and the first score computation cost (CS_S[1]), to the second score computation cost (CS_M[1]). If at this time the first computational cost (CF_S[1]+CS_S[1]) is greater than the second score computation cost (CS_M[1]), the detection group determiner 110 includes level 1 into the detection group $G_1$ that includes level 0.

The detection group determiner 110 continues to perform the above operations on higher levels. If level 4 has a first computational cost (CF_S[4]+CS_S[4]) that is not greater than its second score computation cost (CS_M[4]), the detection group determiner 110 generates a new detection group $G_2$ to include level 4. Also, the detection group determiner 110 sets k to 4 to indicate that a starting group of the detection group $G_2$ is level 4. The detection group determiner 110 classifies all levels of the feature pyramid into n number of detection groups $G_1, G_2, \ldots,$ and $G_n$ by continuing to perform the above operations until the last level p.

Once all levels of the feature pyramid have been classified into n detection groups, the detection group processor 120 may generate one feature map for each detection group $G_1, G_2, \ldots,$ and $G_n$, rather than generating a feature map for every scale of the feature pyramid. At this time, the detection group processor 120 may generate a feature map for each detection group $G_1, G_2, \ldots,$ and $G_n$, in such a manner that the feature map is of a scale that corresponds to the starting level of each detection group. For example, as shown in FIG. 5C, for detection group $G_1$, the detection group processor 120 may generate a feature map of a scale that corresponds to level 0 that is a starting level of said detection group $G_1$, and, for detection group $G_2$, it may generate a feature map of a scale that corresponds to level 4 that is a starting level of said detection group $G_2$.

Also, the detection group processor 120 calculates a score by applying one or more filters to each detection group $G_1, G_2, \ldots,$ and $G_n$. If detection group G includes levels of $\{l_1, l_2, \ldots, l_n\}$, a level of a filter to be applied to a feature map of said detection group G may be determined, using Equation 3 below.

$$f = l_i - l_1, \quad (1 \leq i \leq n) \quad (3)$$

For example, if detection group G1 were to include levels of $\{0, 1, 2, 3\}$, then this means its size is 4, and levels of the filters to be applied thereto may be determined as $\{0, 1, 2, 3\}$.

The detection group processor 120 may calculate a score of each location by applying the determined filters to the feature map generated for the detection group $G_1$. Then, the detection group processor 120 may repeatedly perform the filter determination and score calculation for other detection groups $G_2, \ldots,$ and $G_n$.

Once scores of each location for all detection groups have been calculated, the detection group processor 120 may return a position whose score satisfies all the aforesaid requirements, as the location of the object.

Figure 5D:
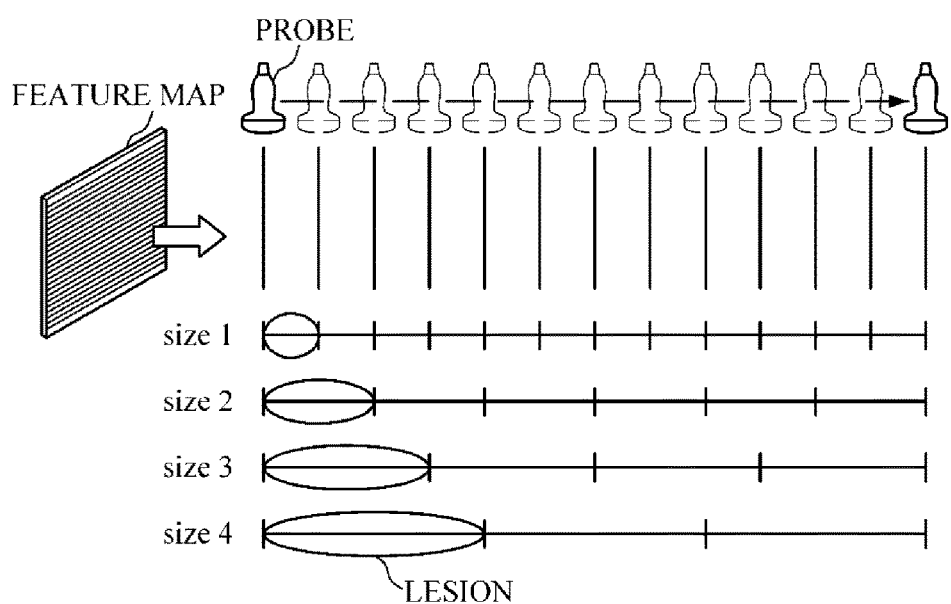

Here, as shown in FIG. 5B, when calculating a score, the group processor 120 may adjust the frequency of detection according to the size (e.g., 1, 2, 3, and 4) of an object (e.g., a lesion) of interest or the size of a filter to be applied. The group processor 120 reduces the frequency of detection for a large object as shown in FIG. 5D, and it increases the frequency of detection for a small object, thereby increasing the overall processing speed. At this time, the location upon which detection is carried out may vary according to the size of the object of interest.

Figure 6:
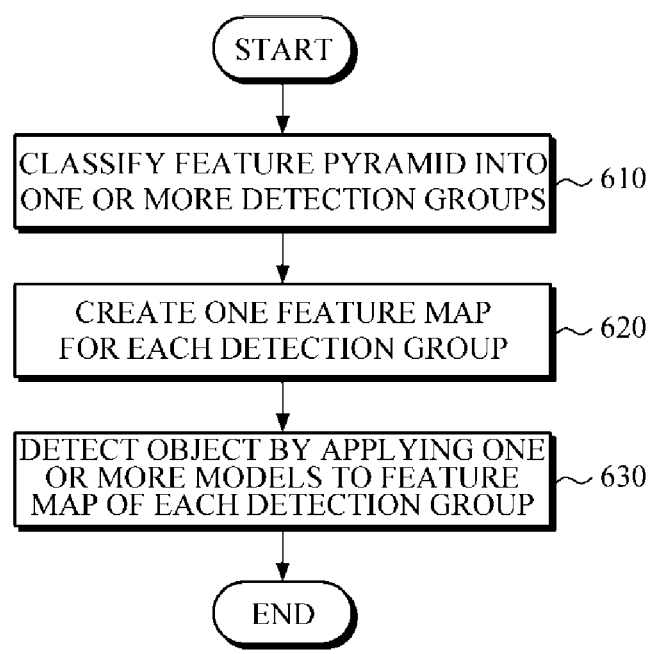
FIG. 6 is a flowchart illustrating a method for detecting an object according to an exemplary embodiment.

FIG. 6 is a flowchart illustrating an example of a method for detecting an object according to an exemplary embodiment.

Various exemplary embodiments of the method for detecting an object which is performed by the object detection apparatus 100 are described above with reference to FIGS. 1 to 5D. Hence, hereinafter, the detailed descriptions of the method will not be reiterated.

Referring to FIG. 6, the object detection apparatus classifies a feature pyramid associated with the entire scale-space into one or more detection groups, as depicted in 610. At this time, primary computational costs for each feature level of the feature pyramid which may be incurred by applying two different models are estimated, and the feature levels are classified into detection groups based on the computational cost estimates.

For example, a computational cost incurred by applying an object detection model that uses a multi-scale feature map and a computational cost incurred by applying an object detection model that uses filters of multiple scales may be estimated, and the feature levels may be classified into detection groups using the computational cost estimates. Here, the object detection model that uses a multi-scale filter map may be a scale-invariant model, and the object detection model that uses feature maps of multiple scales may be a multi-scale model. However, aspects of the present disclosure are not limited to the above.

Once the classification into detection groups is done, a feature map is generated per each detection group, as depicted in 620. At this time, a feature map at a scale that corresponds to a starting level of each detection group, i.e., the lowest level of each detection group may, be generated.

Then, in 630, a model that includes one or more filters is applied to the feature map of each detection group so as to detect an object. At this time, the number of filters to be applied to the feature map of each detection group may be determined based on the size of each detection group.

The object detection apparatus may apply a designated filter to the feature map of each detection group and calculate a score of each location, and then it may detect an object using the calculated scores. For example, if a calculated score of a certain location is greater than a designated threshold, the object may be returned to said location, or the object may be returned to a certain location based on the order of calculated scores (high to low) each to which locations have been assigned.

Figure 7:
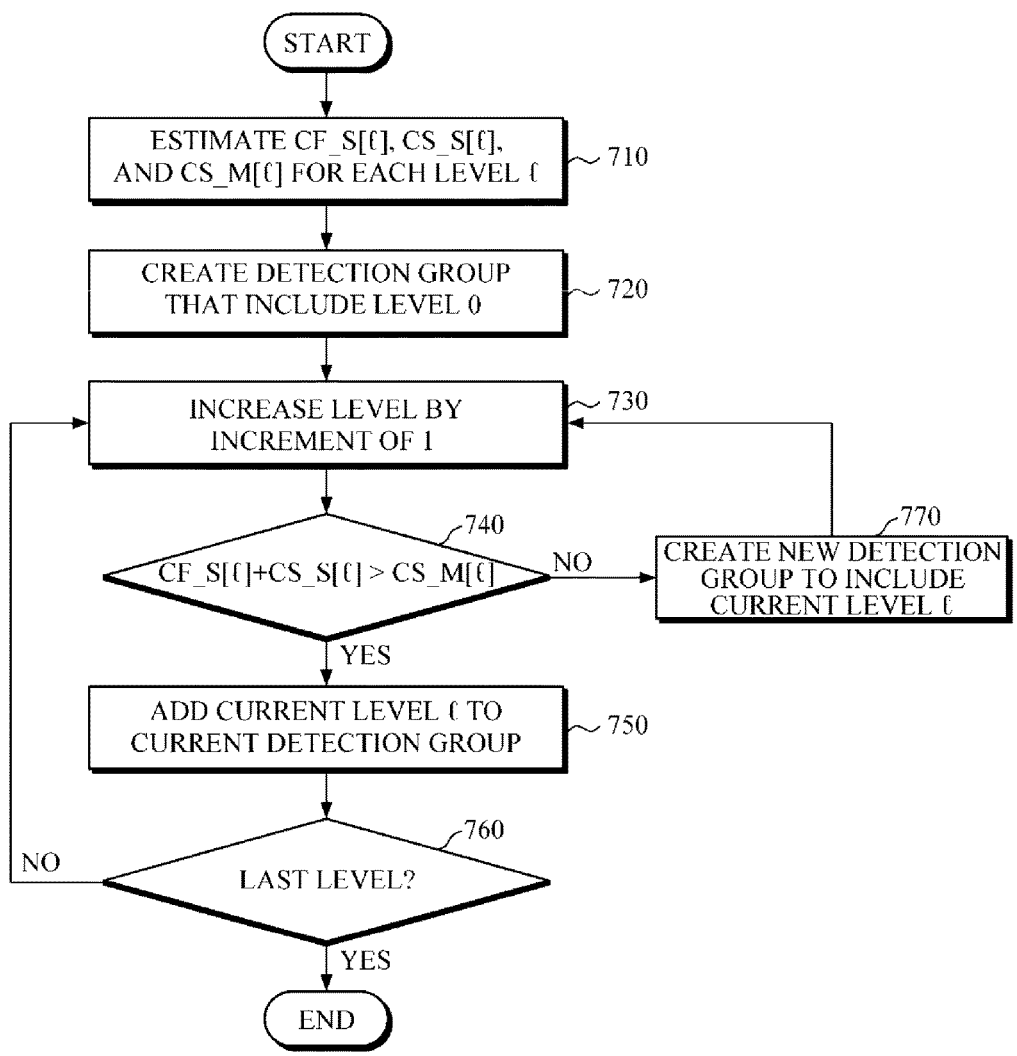
FIG. 7 is a flowchart illustrating an example of the process of the classification into detection groups according to the object detection method of FIG. 6, according to an exemplary embodiment.

FIG. 7 is a flowchart illustrating an example of the process of the classification into detection groups according to the object detection method of FIG. 6.

Referring to 7, as depicted in 710, with respect to each feature level l of the feature pyramid, the object detection apparatus estimates a first feature generation computation cost (CF_S[l]) and a first score computation cost (CS_S[l]) which are incurred by applying a score-invariant model, as well as estimates a second score computation cost (CS_M[l]) incurred by applying a multi-scale model.

Then, the object detection apparatus generates one detection group that includes level 0, as depicted in 720; increases the level by an increment of 1, as depicted in 730; compares the sum of a first feature generation computation cost and a first score computation cost of the increased level (e.g., CF_S[1] and CS_S[1]) to a second score computation cost of said level (e.g., CS_M[1]), as depicted in 740. At this time, if the sum of the first feature generation computation cost and the first score computation cost is greater than the second score computation cost, the current level, i.e., 1 is included in the current detection group, as depicted in 750.

Thereafter, in 760, it is determined whether the current level is the last level of the feature map. If the current level (e.g., 1) is not the last level, the level is increased by an increment of 1, and the above operations are performed for the increasing level (e.g., level 2).

If it is determined in 740 that the sum of CF_S[1] and CS_S[1] is not greater than CS_M[1], the object detection apparatus generates a new detection group to include the current level, i.e., 1, as depicted in 770, and then it increases the level by an increment of 1, and repeatedly performs operation 740 and the following operations for level 2.

The above procedures are repeatedly performed until the flow reaches the last level. In response to the determination, as shown in 760, that the current level is the last level, the flow for detection group classification is ended.

Figure 8:
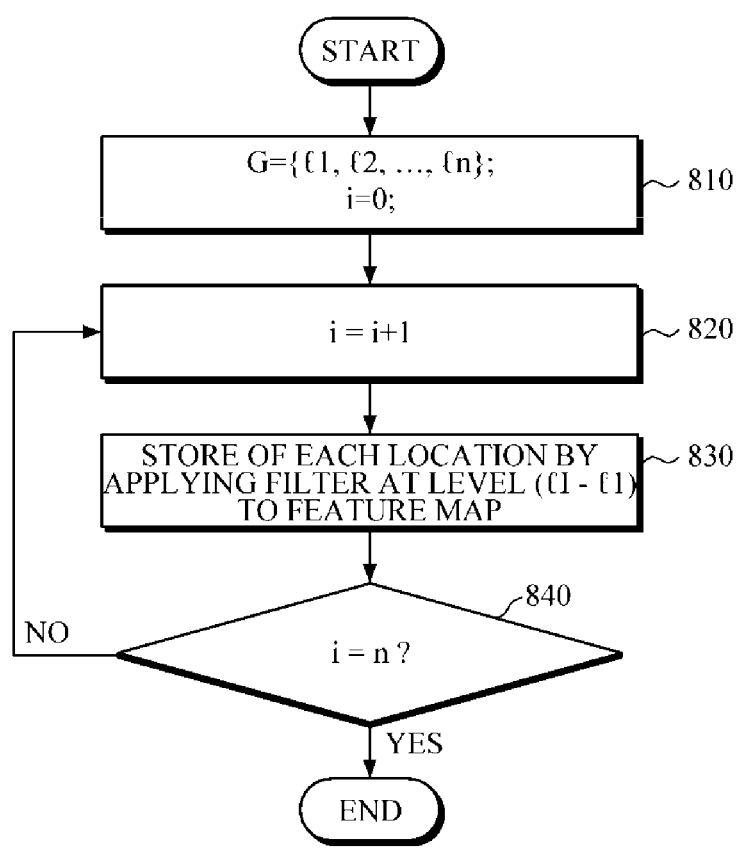
FIG. 8 is a flowchart illustrating an example of the process of application of a model to a feature map according to the object detection method of FIG. 6, according to an exemplary embodiment.

FIG. 8 is a flowchart illustrating an example of the process of application of a model to a feature map according to the object detection method of FIG. 6.

Referring to FIG. 8, a certain detection group G includes levels of $l_1, l_2, \ldots, l_n$, the object detection apparatus sets i to 0 in order to apply a filter to said detection group G, as depicted in 810.

Then, the object detection apparatus increases i by an increment of 1, as depicted in 820, and then calculates a score of each location by applying a filter that corresponds to a level of $l_i$-$l_1$ to a feature map generated for the detection group G, as depicted in 830.

Thereafter, it is determined in 840 that a value of i is the same as n that denotes the number of levels included in the detection group G. If it is determined that i is different from n, the flow returns to operation 820, and i is increased by 1, and a filter that corresponds to the increased level is applied to the feature map, thereby calculating a score, as depicted in 830. The above operations are repeatedly performed until the same number of filters as the n number of levels included in the detection group G are all applied to the feature map.

Figure 9:
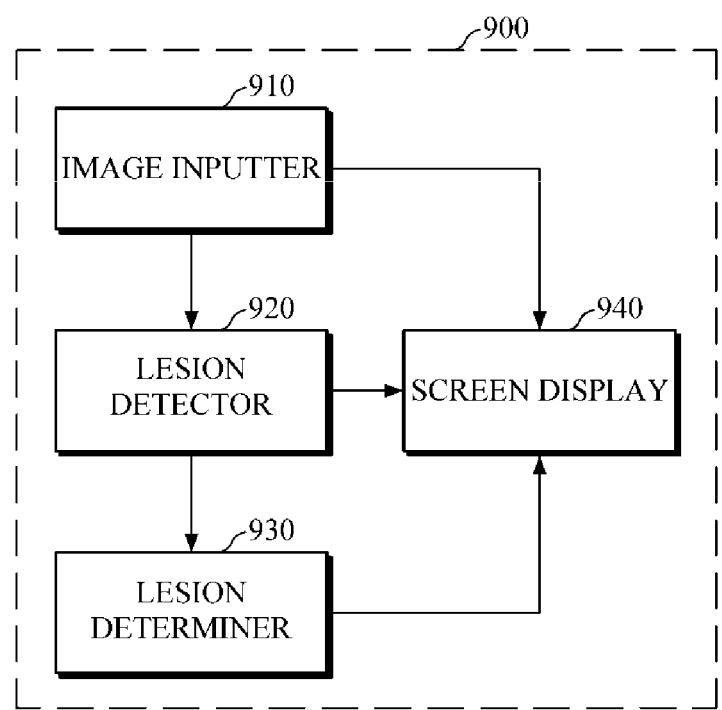
FIG. 9 is a block diagram illustrating a computer-aided diagnosis (CAD) apparatus according to an exemplary embodiment.

FIG. 9 is a block diagram illustrating an example of a computer-aided diagnosis (CAD) apparatus according to an exemplary embodiment.

The aforesaid exemplary embodiments of the object detection apparatus 100 may be applicable to a CAD apparatus that can detect lesions from medical images and make a diagnosis.

Referring to FIG. 9, an example CAD apparatus 900 may include an image inputter 910, a lesion detector 920, a lesion determiner 930, and a screen display 940.

The image inputter 910 may receive a medical image. The medical image may be an ultrasound image acquired by a probe in real-time, but aspects of the present disclosure are not limited thereto.

The lesion detector 920 may scan for a lesion in the input medical image. At this time, the lesion detector 920 may detect one or more lesions by applying the aforementioned combined object detection model that incorporates a scale-invariant model and a multi-scale model.

For example, with respect to each feature at each scale that constitutes the entire scale-space, the lesion detector 920 may estimate a feature generation computation cost and a score computation cost which may be incurred by applying a scale-invariant model, as well as estimate score computation costs which may be incurred by applying a multi-scale model.

Also, the detection detector 920 may classify scale levels of the feature pyramid into one or more detection groups by using each model, for example, by using the computational cost estimates incurred by applying a scale-invariant model.

In addition, once the feature levels are classified into one or more detection groups, the lesion detector 920 may create one feature map for each detection group with respect to the input medical image. Moreover, the lesion detector 920 may determine the level and the number of filters to be applied to the feature map of each detection group based on the size of each detection group. In addition, the lesion detector 920 may compute a score of each location by applying one or more filters that correspond to the determined level to the feature map.

The lesion detector 920 may scan for and detect a lesion at a location that satisfies a designated condition (for example, a score of the location is greater than a predefined threshold value).

The aforesaid exemplary embodiments of the object detection apparatus 100 may be applicable to the lesion detector 920, and any further description of the lesion detection will be omitted hereinafter.

The lesion determiner 930 may diagnose each of one or more lesions detected by the lesion detector 920 as being benign or malignant. Additionally, the lesion determiner 930 may measure the size of detected lesions, various feature data, as well as a result of breast-imagining-reporting and data system (BI-RADS) classification.

When the image inputter 910 receives an image from the probe, the screen display 940 outputs the received medical image to a screen. Also, when the lesion has been detected by the lesion detector 920, the screen display 940 displays the detected lesion on the image output to a screen. At this time, in order to facilitate a user with easy identification of the lesion, various visual indicators may be used. For example, an oval, a circle, or a rectangular may be output near the lesion on the image, and the color or line thickness thereof may vary.

When the lesion determiner 930 has made a determination, the screen display 940 may output the determination to overlap the image displayed on the screen, or output the determination in an area different from that of the image is displayed.

Figure 10:
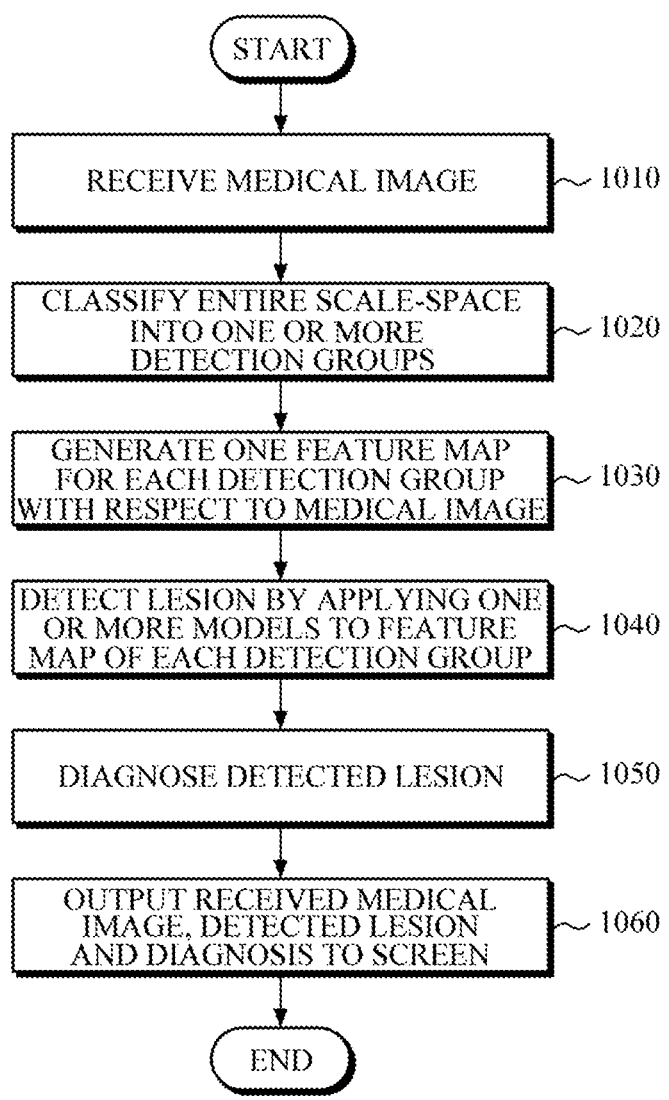
FIG. 10 is a flowchart illustrating a CAD method according to an exemplary embodiment.

FIG. 10 is a flowchart illustrating an example of a computer-aided diagnosis method according to an exemplary embodiment.

The exemplary embodiment shown in FIG. 10 may be a CAD method performed by the CAD apparatus 900 of FIG. 9.

Referring to FIG. 9, the CAD apparatus receives a medical image, such as an ultrasound image, as depicted in 1010.

Then, the entire scale-space for generating a feature map from the received medical image may be classified into one or more detection groups, as depicted in 1020. At this time, the entire scale-space may be a feature pyramid that consists of levels of multiple scales for an application of a scale-invariant model.

As previously described, the CAD apparatus may estimate both feature generation computation costs and score computation costs incurred by applying a scale-invariant model to the medical image, as well as estimate score computation costs incurred by applying a multi-scale model to the medical image. By using the computational cost estimates, the classification into one or more detection groups may be performed.

As shown in 1030, one feature map is generated for each of the classified detection groups, with respect to the received medical image. At this time, a feature map at a scale that corresponds to the lowest level of each detection group may be generated.

Then, lesions may be detected in the medical image i by applying a model that includes of one or more filters to the feature map of each detection group, as depicted in 1040. At this time, one or more filters to be applied to the feature map of each detection group may be determined based on the size of each detection group, i.e., the number of levels included in each detection group, and a score of each location may be calculated by applying the designated filters to the feature map of a specific detection group. Also, a lesion may be detected, using the scores calculated with respect to each detection group.

Once a lesion is detected in the medical image, a diagnosis of the lesion may be made, as depicted in 1050. In some exemplary embodiments, a diagnosis may be made as to whether the detected lesion is benign or malignant, the size of the detected lesion may be measured, or BI-RADS classification may be performed.

Thereafter, the received medical image may be output to the screen, and the result of lesion detection and the diagnosis may be output to the screen, as depicted in 1060. At this time, using the result of lesion detection, an oval, a circle, or a rectangle may be displayed on the screen to make the lesion easily recognizable to the user.

The current embodiments can be implemented as computer readable codes in a computer readable record medium. Codes and code segments constituting the computer program can be easily inferred by a skilled computer programmer in the art. The computer readable record medium may include all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting an object in an image, the apparatus comprising:
a memory configured to store instructions; and
at least one processor, upon executing the stored instructions, configured to:

classify a plurality of feature levels included in the image into one a plurality of detection groups, wherein the plurality of feature levels includes multiple scales, create a plurality of feature maps which respectively correspond to the plurality of detection groups from the image, wherein each of the plurality of feature maps includes a feature map which corresponds to a lowest feature level in each of the plurality of detection groups; and detect an object by applying one or more models to the plurality of feature maps.

2. The apparatus of claim 1, wherein the at least one processor is further configured to:

generate a plurality of computational cost estimates corresponding to the plurality of feature levels, and classify the plurality of feature levels into the plurality of detection groups using the plurality of computational cost estimates.

3. The apparatus of claim 2, wherein the plurality of computational cost estimates comprise:

a first plurality of feature generation computation costs associated with feature generation during application of a scale-invariant model, a first plurality of score computation costs associated with score calculation during application of a scale-invariant model, and a second plurality of score computation costs associated with score calculation during application of a multi-scale model.

4. The apparatus of claim 3, wherein the at least one processor is further configured to:

compare the first plurality of feature generation computation costs and the first plurality of score computation costs, to the second plurality of score computation costs, and classify the plurality of feature levels into the plurality of detection groups based on the comparison.

5. The apparatus of claim 1, wherein each one of the plurality of feature maps is created at a scale corresponding to the lowest feature level in each one of the plurality of detection groups.

6. The apparatus of claim 1, wherein the at least one processor is further configured to determine a number of models to be applied to the plurality of detection groups based on one or more sizes associated with the plurality of detection groups.

7. The apparatus of claim 6, wherein the at least one processor is further configured to:

calculate one or more scores corresponding to the plurality of detection groups by applying a plurality of scaled filters to the plurality of feature maps, wherein a number of the plurality of scaled filters corresponds to the number of models, and detect the object using the one or more scores.

8. The apparatus of claim 7, wherein the at least one processor is further configured to:

adjust a frequency of detection based on a size of the object to be detected, and calculate the one or more scores based on the adjusted frequency of detection.

9. A method for detecting an object in an image, comprising:

classifying a plurality of feature levels included in the image into a plurality of detection groups, wherein the plurality of feature levels includes multiple scales;

creating a plurality of feature maps which respectively correspond to the plurality of detection groups, wherein each of the plurality of feature maps includes a feature map which corresponds to a lowest feature level in each of the plurality of detection groups; and detecting an object by applying one or more models to the plurality of feature maps.

10. The method of claim 9, wherein the classifying the plurality of feature levels into the plurality of detection groups comprises:

generating a plurality of computational cost estimates associated with the plurality of feature levels; and classifying the plurality of feature levels into the plurality of detection groups using the plurality of computational cost estimates.

11. The method of claim 10, wherein the plurality of computational cost estimates include:

a first plurality of feature generation computation costs associated with feature generation during application of a scale-invariant model;

a first plurality of score computation costs associated with score calculation during application of a scale-invariant model; and a second plurality of score computation costs associated with score calculation during application of a multi-scale model.

12. The method of claim 11, wherein the classifying the plurality of feature levels into the plurality of detection groups includes:

comparing the first plurality of feature generation computation costs and the first plurality of score computation costs, with the second plurality of score computation costs; and classifying the plurality of feature levels into the plurality of detection groups based on the comparison.

13. The method of claim 11, wherein the classifying the plurality of feature levels into the plurality of detection groups comprises:

creating a first detection group that includes a lowest feature level of the plurality of feature levels;

calculating a first computation cost by combining a first feature generation computation cost of the first plurality of feature generation computation costs with a first score computation costs of the first plurality of score computation costs;

comparing the first computation cost with a second score computation cost of the second plurality of score computation costs associated with a first feature level that is higher than a highest feature level of the first detection group;

in response to the first computation cost being greater than the second score computation cost, adding the first feature level to the first detection group; and in response to the first computation cost being less than or equal to than the second score computation cost, creating a second detection group to include the first feature level.

14. The method of claim 9, wherein the creating of the plurality of feature maps includes creating a feature map at a level that corresponds to the lowest feature level in each one of the plurality of detection groups.

15. The method of claim 9, wherein the detection of the object comprises determining a number of models to be applied to the plurality of detection groups based on one or more sizes associated with the plurality of detection groups.

16. The method of claim 15, wherein the detecting the object comprises:

calculating one or more scores corresponding to the plurality of detection groups by applying a plurality of scaled filters to the plurality of feature maps, wherein a number of the plurality of scaled filters corresponds to the number of models; and detecting the object using the one or more scores.

17. The method of claim 16, wherein the detecting the object further comprises adjusting a frequency of detection based on a size of the object to be detected, and wherein the calculating the one or more scores further comprises calculating the one or more scores based on the adjusted frequency of detection.

18. A computer-aided diagnosis (CAD) apparatus comprising:

a memory configured to store instructions; and at least one processor, upon executing the stored instructions, configured to:

in response to receiving a medical image, classify a scale-space of the medical image into a plurality of detection groups, create a plurality of feature maps which respectively correspond to the plurality of detection groups from the received medical image, wherein each of the plurality of feature maps includes a feature map which corresponds to a lowest feature level in each of the plurality of detection groups, detect a lesion by applying one or more models to the plurality of feature maps, and determine whether the detected lesion is benign.

19. The CAD apparatus of claim 18, wherein, with respect to a plurality of scales in the scale-space, the at least one processor is further configured to:

estimate a first plurality of feature generation computation costs and a first plurality of score computation costs associated with applying a scale-invariant model, estimate a second plurality of score computation costs by associated with applying a multi-scale model, and classify the plurality of scales into the plurality of detection groups by taking into consideration the first plurality of feature generation computation costs, the first plurality of score computation costs, and the second plurality of score computation costs.

20. The CAD apparatus of claim 18, wherein the at least one processor is further configured to:

determine a number of the one or more models based on one or more sizes associated with the plurality of detection groups, calculate a plurality of scores associated with a plurality of locations by applying one or more filters of different scales, wherein a number of the one or more filters is equal to the number of the one or more models, and detect that a location of the plurality of locations whose score estimate is greater than a designated threshold is the lesion.

* * * * *